United States Patent
Shafaat et al.

(10) Patent No.: US 9,758,256 B1
(45) Date of Patent: Sep. 12, 2017

(54) PILOT-CONFIGURABLE INFORMATION ON A DISPLAY UNIT

(71) Applicant: The Boeing Company, Chicago, IL (US)

(72) Inventors: Syed Tahir Shafaat, Everett, WA (US); Tan Nhat Che, Federal Way, WA (US); Julian Ametsitsi, Marysville, WA (US); Charles Frederick Bell, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 333 days.

(21) Appl. No.: 13/959,803

(22) Filed: Aug. 6, 2013

(51) Int. Cl.
*G06F 7/70* (2006.01)
*G06F 19/00* (2011.01)
*G06G 7/00* (2006.01)
*G06G 7/76* (2006.01)
*B64D 43/00* (2006.01)
*G06F 17/00* (2006.01)

(52) U.S. Cl.
CPC .............. *B64D 43/00* (2013.01); *G06F 17/00* (2013.01)

(58) Field of Classification Search
CPC ................................ B64D 43/00; G06F 17/00
USPC ........................................................... 701/14
See application file for complete search history.

(56) References Cited

U.S. PATENT DOCUMENTS

| | | | |
|---|---|---|---|
| 5,890,787 A * | 4/1999 | McNelley | G03B 15/10 348/E5.13 |
| 7,136,030 B2 | 11/2006 | Steed et al. | |
| 7,321,318 B2 | 1/2008 | Crane et al. | |
| 2004/0142745 A1* | 7/2004 | Hosaka | G07F 17/3227 463/31 |
| 2005/0270432 A1* | 12/2005 | Overline | G02F 1/1333 349/16 |
| 2009/0017424 A1* | 1/2009 | Yoeli et al. | 434/44 |
| 2010/0067118 A1* | 3/2010 | Takahashi | G02B 27/01 359/633 |
| 2013/0083249 A1* | 4/2013 | Nonomura | H04N 5/64 348/725 |

* cited by examiner

*Primary Examiner* — Imran Mustafa
(74) *Attorney, Agent, or Firm* — Ostrager Chong Flaherty & Broitman P.C.

(57) ABSTRACT

A small thin display unit that can be installed in the flight deck for displaying only flight crew-selected tactical information needed for the task at hand. The flight crew can select the tactical information to be displayed by means of any conventional user interface. Whenever the flight crew selects tactical information for display, the user interface sends a corresponding request for tactical information to a computer system. The computer system processes the request, including periodically retrieving measured current values or computing current values for the requested tactical parameters and returning those current tactical parameter values to the display unit for display.

20 Claims, 5 Drawing Sheets

ΡΙLOT-CONFIGURABLE INFORMATION ON
A DISPLAY UNIT

The invention described herein was made in the performance of work under NASA Contract No. NNL10AA05B and is subject to the provisions of Section 305 of the National Aeronautics and Space Act of 1958 (72 Stat. 435: 42 U.S.C. 2457).

BACKGROUND

This disclosure generally relates to systems and methods for controlling the information displayed on a flight deck or cockpit display of an aircraft.

Modern commercial aircraft make extensive use of computer systems to control aircraft behavior, plan and execute flights, and display information to the pilots during flight operations. Modern aircraft typically include cockpit displays that are controlled by an information management system. Cockpit displays include the basic displays that are supplied with the aircraft, and other add-on displays which vary in their degree of integration with the physical aircraft structure and aircraft systems. While the display screens may provide all the information the pilots require for flight operations, pilots are continually seeking additional information and additional flexibility and predictability in the way the information is presented.

There is very limited space available in the flight deck and no additional display unit can be added unless it is thin. Also the flight crew has very little control as to where tactical information will be displayed during different phases of flight. Accordingly, it would be desirable to provide a system whereby a pilot could concentrate the display of tactical information at a small thin display unit installed within his primary field of view.

SUMMARY

The subject matter disclosed herein is directed to a small thin display unit that can be installed in the flight deck of an airplane for displaying only flight crew-selected tactical information needed for the task at hand. The flight crew can select the tactical information to be displayed by means of any conventional interface, such as a selector knob having respective positions or a set of respective graphically displayed virtual buttons corresponding to the different displays of tactical information available for selection. Whenever the flight crew selects tactical information for display, the control unit sends a corresponding request for tactical information to a computer system, such as an information management system.

In some embodiments, the requested tactical information can be automatically retrieved by the information management system from the computer systems or processors that store the current measured or computed values of the desired tactical parameters. In other embodiments, the information management system may comprise a tactical information processor that retrieves aircraft flight information stored in local memory (e.g., random access memory) and optionally performs further calculations in response to each request for tactical information. The flight crew may request the current value of a single tactical parameter or the current values of a multiplicity (i.e., a configuration) of tactical parameters. For example, in response to receiving a request for tactical information from the flight crew, an information management system may be programmed to query the airplane system or systems where the requested tactical information is stored or a tactical information processor may be programmed to retrieve the requested tactical information from local memory or compute the tactical information based on aircraft flight information retrieved from local memory. In either case, the retrieved and/or calculated current values of selected tactical parameters are then forwarded to the display unit, where the information is displayed in a preconfigured format using agreed-to symbology. This process is repeated periodically in order to continually update the current values of the tactical parameters to be displayed on the small thin display unit during a particular leg or phase of the flight or during a particular maneuver being executed by the flight crew.

One aspect of the subject matter disclosed in detail below is a display unit comprising: a housing; memory storing data; an image processor housed in the housing, the image processor being programmed to generate image data which is a function of the stored data; an imaging surface affixed to the housing and operatively coupled to the image processor for displaying an image that is a function of image data generated by the image processor; and a viewing surface having an acute angular position relative to the imaging surface. A reflection of an image on the imaging surface is reflected from the viewing surface toward a vantage point when the viewing surface is in the acute angular position. The image processor is programmed to generate image data representing reversed alphanumeric characters. The imaging surface is fixed relative to the housing and the acute angular position of the viewing surface relative to the imaging surface may be adjustable. The viewing surface may comprise a mirror or glass. The imaging surface may comprise a liquid crystal display screen.

Another aspect of the disclosed subject matter is a system comprising a control panel and a display unit mounted to the control panel and situated in a pilot's primary field of view, wherein the display unit comprises: an imaging surface; an image generator programmed to generate image data which is a function of data received from the selected one of the information systems, and further programmed to control the imaging surface to display an image that is a function of the generated image data; and a viewing surface having an acute angular position relative to the imaging surface. The system may further comprise a computer system including memory (for example, random access memory) for storing tactical information, and a control unit operable by a pilot for sending a request for tactical information to the computer system. The computer system is programmed to retrieve the requested tactical information from memory or to retrieve flight information from memory from which the requested tactical information can be calculated. The retrieved and/or calculated tactical information is then forwarded to the display unit.

In one embodiment, the computer system is programmed to: (a) compute the current value of a tactical parameter; and (b) send the current value of the tactical parameter to the display unit. The computer system is programmed to repeat steps (a) and (b) periodically to provide respective updated current values of the tactical parameter to the display unit for display at respective subsequent times. For example, the tactical parameters may include the speed and/or heading of the aircraft and a distance or time to a waypoint or location of another aircraft.

A further aspect of the disclosed subject matter is a method comprising mounting a display unit to an existing cockpit display on an aircraft, the display unit having an imaging surface disposed generally horizontally and a viewing surface disposed at an acute angle relative to the imaging surface to enable an image displayed on the imaging surface and reflected by the viewing surface to be viewable in a primary field of view of a pilot.

The method described in the preceding paragraph may further comprise: (a) operatively coupling the display unit to a computer system; (b) operating a control unit to select a tactical parameter for display; (c) sending a request for the selected tactical parameter from the control unit to the computer system; (d) computing a current value of the selected tactical parameter; (e) sending the current value of the selected tactical parameter from the computer system to the display unit; (f) displaying a reverse image of the current value of the selected tactical parameter on the imaging surface of the display unit; and (g) repeating steps (d) through (f) periodically to provide a respective updated current value of the selected tactical parameter to the display unit for display at respective subsequent times.

Other aspects are disclosed in detail and claimed below.

BRIEF DESCRIPTION OF THE DRAWINGS

Reference will hereinafter be made to the drawings in which similar elements in different drawings bear the same reference numerals.

DETAILED DESCRIPTION

Embodiments of systems and methods for displaying tactical information on a small thin display unit installed on a control panel of a flight deck will now be disclosed in detail for the purpose of illustration. In accordance with these embodiments, the housing of the small thin display unit can have a height in the range of one to two inches and a width in the range of four to ten inches to allow the small thin display unit to be installed in between two larger display units on an existing panel. Preferably the small thin display unit is installed in a pilot's primary field of view for the purpose of displaying flight crew-selected tactical information, such as aircraft speed, aircraft heading, distance to a waypoint, or distance to another aircraft. Alternatively, instead of guidance-related tactical information, other types of aircraft flight information could be displayed on the small thin display unit if selected by the flight crew, including but not limited to any information stored in an information management system operatively coupled to the small thin display unit and/or any information which can be retrieved by the information management system from other airplane systems. What information is selected and displayed will depend on which task the flight crew is presently performing.

Figure 1:
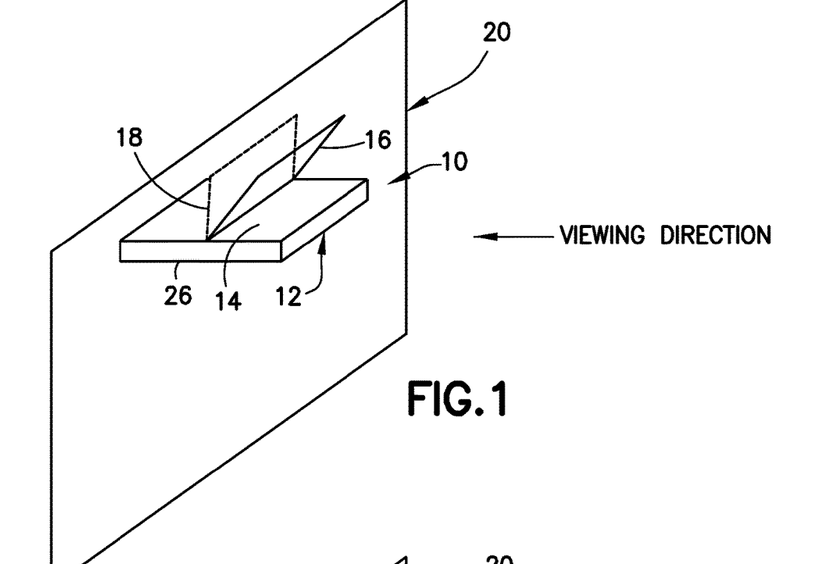
FIG. 1 is a diagram representing an isometric view of a small thin display unit mounted on a panel of a flight deck in accordance with one embodiment.

FIG. 1 shows a small thin display unit 10 mounted on a panel 20 of a flight deck in accordance with one embodiment. The display unit 10 comprises an image generator 12 and a viewing surface 16 that may be pivotably or fixedly coupled to the image generator 12 (e.g., by means of pivots or hinges). The viewing surface 16 is made of a light-reflecting material such as a mirror or glass plate. The image generator 12 comprises an imaging surface 14 on which an image can be generated. In the embodiment shown in FIG. 1, the imaging surface 14 is on the top of the display unit 10. The angular position of the viewing surface 16 relative to the imaging surface 14 can be adjusted so that any image generated on the imaging surface 14 will be reflected by the viewing surface 16 toward the pilot, i.e., in a direction opposite to the viewing direction. The reflected image appears to the observer to be disposed in a plane 18 (indicated by dashed lines in FIG. 1). If the viewing surface 16 is disposed at an acute angle of 45 degrees relative to the imaging surface 14, then plane 18 will be perpendicular to the imaging surface 14.

The image generator 12 comprises a housing 26 that has one end attached to the panel 20. The housing 26 is in the shape of a cuboid that projects generally perpendicular to the panel 20 and parallel to a viewing direction (indicated by an arrow in FIG. 1), e.g., a line of sight of a pilot. The imaging surface 14 is supported by and affixed to the top of the housing 26. The imaging surface 14 may be disposed generally parallel to the viewing direction. The imaging surface 14 may comprise a liquid crystal display screen.

In accordance with one embodiment, the housing 26 has a height of about one inch and a width in the range of four to ten inches. The height, above the imaging surface 14, of the displayed image which appears to be disposed in plane 18 may also be one inch or more. The total height of the display unit 10 (i.e., the distance between the top edge of the viewing surface 16 and the bottom of image generator 12) will depend on how much space is available above or below an existing display unit or between two existing display units (not shown in FIG. 1) on the panel 20 in the flight deck for installation of the display unit 10. The display unit 10 is preferably mounted to the panel 20 at a height and a lateral position within the pilot's primary field of view. Due to its thin profile and the design, display unit 10 can be installed just above or below existing display units in the flight deck without blocking any other information displayed on the other display units.

The image generator 12 further comprises memory for storing data and an image processor, both of which are housed inside the housing 26 and not visible in FIG. 1. The image processor (not shown in FIG. 1) is programmed to generate image data which is a function of data stored in the memory. The stored data comprises digital data representing tactical information. The image processor converts selected stored data into digital data representing mirror images of alphanumeric and graphical symbols. When those mirror images of alphanumeric and graphical symbols are generated on the imaging surface 14, light transmitted from the imaging surface 14 will be reflected by the viewing surface 16 toward the observer, as previously described. The mirror image is rotated, reversed and adjusted for readability in the desired plane for the pilot. More specifically, the image processor of image generator 12 comprises image flipping means that can selectively flip the digitized optical image horizontally and vertically so that the optical image that appears on the imaging surface 14 will be the mirror image of the image which is viewed by the observer. The viewing surface 16 displays an image that comprises alphanumeric and graphical symbols arranged in a format and configuration that is selected by and readily understood by the flight crew. For example, the symbology may include graphical symbols representing waypoints, other aircraft, heading, track, taxi route, ground traffic, runway landmarks, etc.

Figure 2:
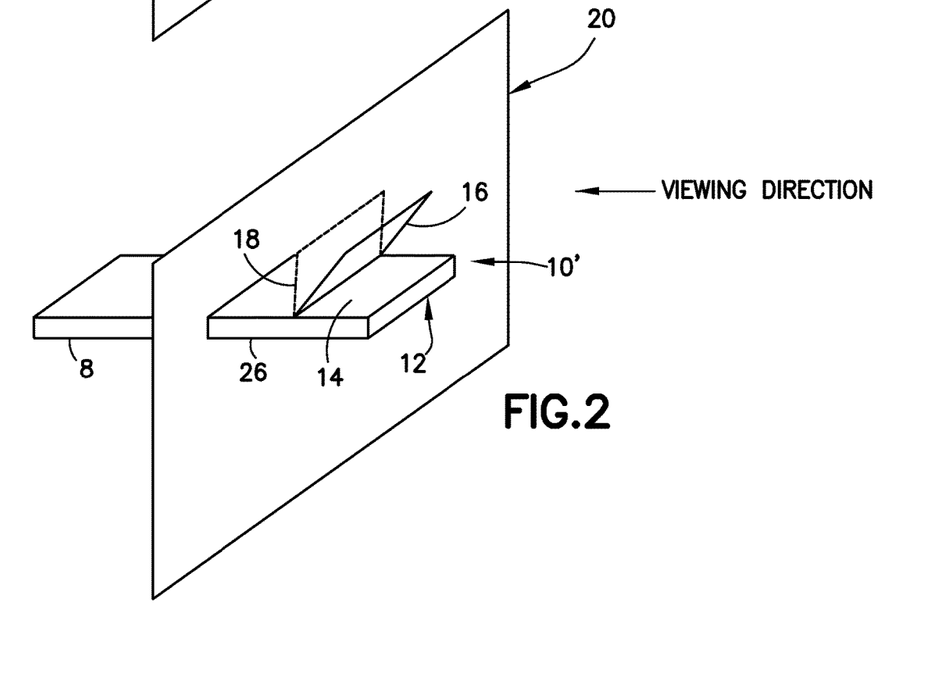
FIG. 2 is a diagram representing an isometric view of a small thin display unit inserted in a slot formed in a panel of a flight deck in accordance with another embodiment.

In accordance with an alternative embodiment depicted in FIG. 2, a forward portion of the image generator 12 can be inserted in and enclosed by an enclosure 8 that fits in the available space in the flight deck in the pilot's primary field of view.

Figure 3:
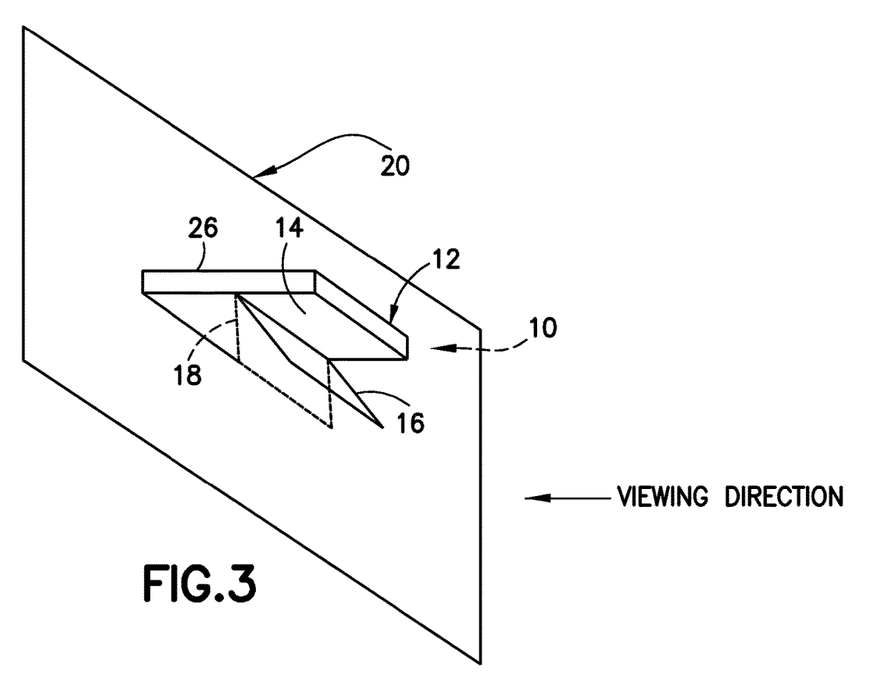
FIG. 3 is a diagram representing an isometric view of a small thin display unit mounted on a panel of a flight deck in accordance with a further embodiment.

FIG. 3 depicts a small thin display unit 10 mounted on a panel 20 of a flight deck in accordance with a further embodiment. In this instance, the imaging surface 14 is disposed on the bottom of the display unit 10 instead of on the top, and the viewing surface 16 is angled downward instead of upward. In this arrangement, the pilot sees an apparent display image in a plane 18 disposed underneath the image generator 12 instead of above it.

Figure 4:
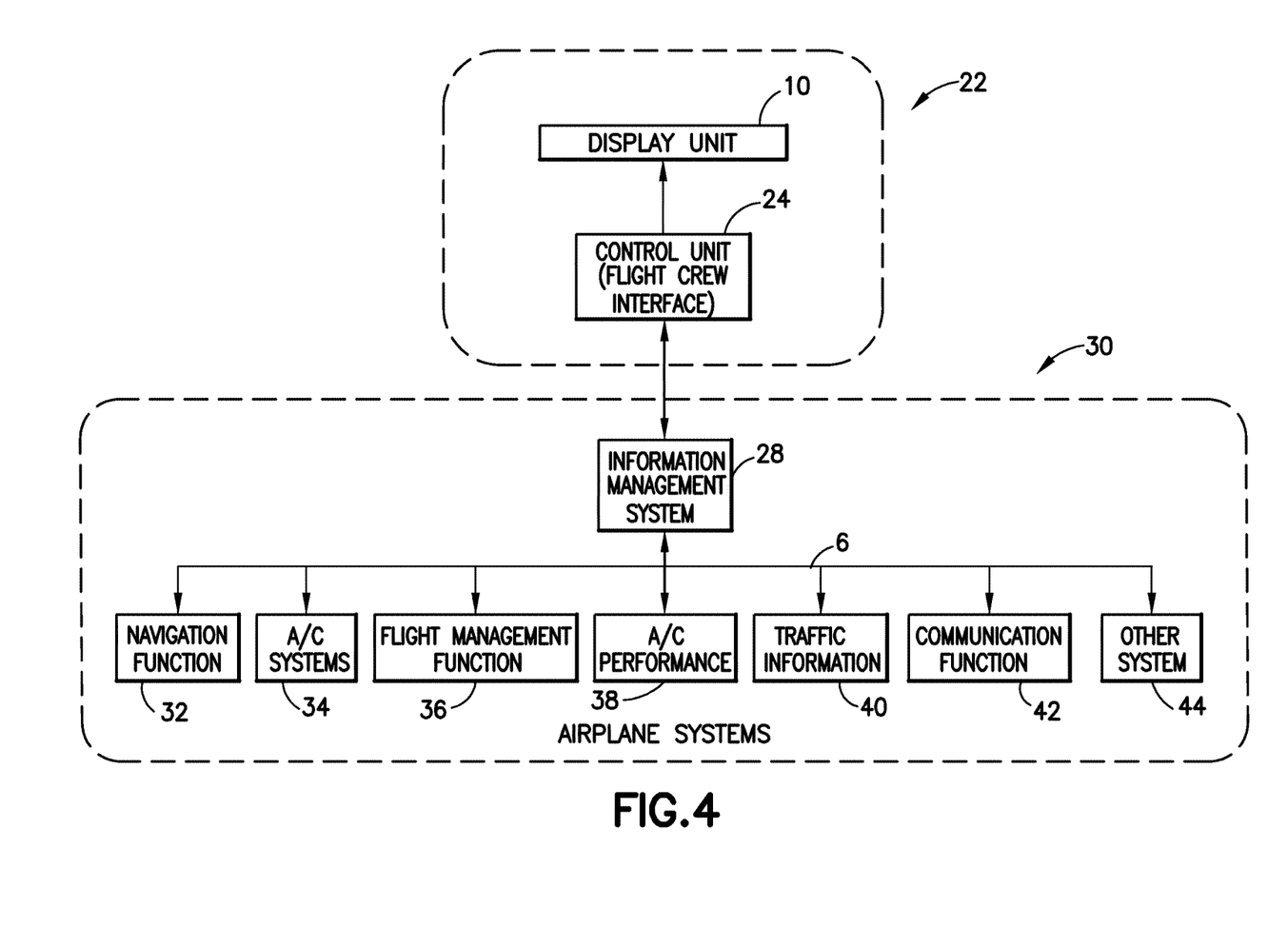
FIG. 4 is a block diagram representing components of a pilot-configurable information display system in accordance with one embodiment.

FIG. 4 is a block diagram representing components of a pilot-configurable information display system in accordance with one embodiment. A control unit 24 provides the interface for the flight crew to enter a request for tactical information to be displayed on the display unit 10. More specifically, the control unit 24 may comprise a selector knob having respective angular positions or a set of respective graphically displayed virtual buttons corresponding to the different displays of tactical information available for selection. In the alternative, the control unit 24 may be programmed to accept pilot inputs entered in a command line by means of a keyboard. The control unit 24 further comprises a computer or a processor that is programmed to decode the pilot inputs (e.g., the angular position of a knob or the area on a graphical user interface touched by the pilot) and convert those inputs into appropriate requests for tactical information in a standard message format for transmission to an information management system 28. For example, in response to a single pilot input, the control unit can be programmed to construct a message comprising a request for a pre-configured set of tactical information for display rather than just a single item of tactical information.

The control unit 24 can be integrated with the display unit 10 or it can be located elsewhere in the flight deck. The control unit 24 may be part of the existing interfaces in the flight deck or a separate control unit may be installed. The control unit 24 provides a means by which the flight crew can select the tactical information which they want to be displayed. Tactical information can be selected by the flight crew in the beginning of the flight for different phases of flight or can be selected during the flight on an as-needed basis. In accordance with the embodiment shown in FIG. 4, tactical information can be automatically retrieved by the information management system 28 from the computer system(s) or processor(s) that store current values (measured or computed) for the tactical parameters of interest. Examples of types of tactical information which can be selected for display include, but are not limited to, the following: flight time or distance of ownship to a certain waypoint; flight time or distance separating ownship and a leading aircraft; the cleared taxi route for ownship at the destination/origination airport; or when to call ground control when ownship is abeam, overhead or past a certain location in the flight path.

The information management system 28 comprises a computer or processor that is programmed to process tactical information requests from the control unit 24 and then send queries to the appropriate airplane system(s). FIG. 4 depicts a computer system 30 wherein an information management system 28 and a multiplicity of airplane systems 30 are connected to and communicate via a data bus 6. The queries are sent over the data bus 6 and the tactical information responsive to the queries is returned to the information management system 28 via the same data bus 6. Examples of airplane systems (each comprising a separate computer or processor with memory for storing information) which could be queried include the following: a system that performs a navigation function 32, aircraft systems 34 (e.g., electrical, propulsion, cooling, etc.), a system that performs a flight management function 36, an aircraft performance monitoring system 38, a traffic information system 40, a system that performs a communication function 42, or some other system 44. The information management system 28 can either forward the retrieved tactical information to the control unit 24 (as shown in FIG. 4) or send the tactical information directly to the display unit 10 for display (not shown in FIG. 4).

Figure 5:
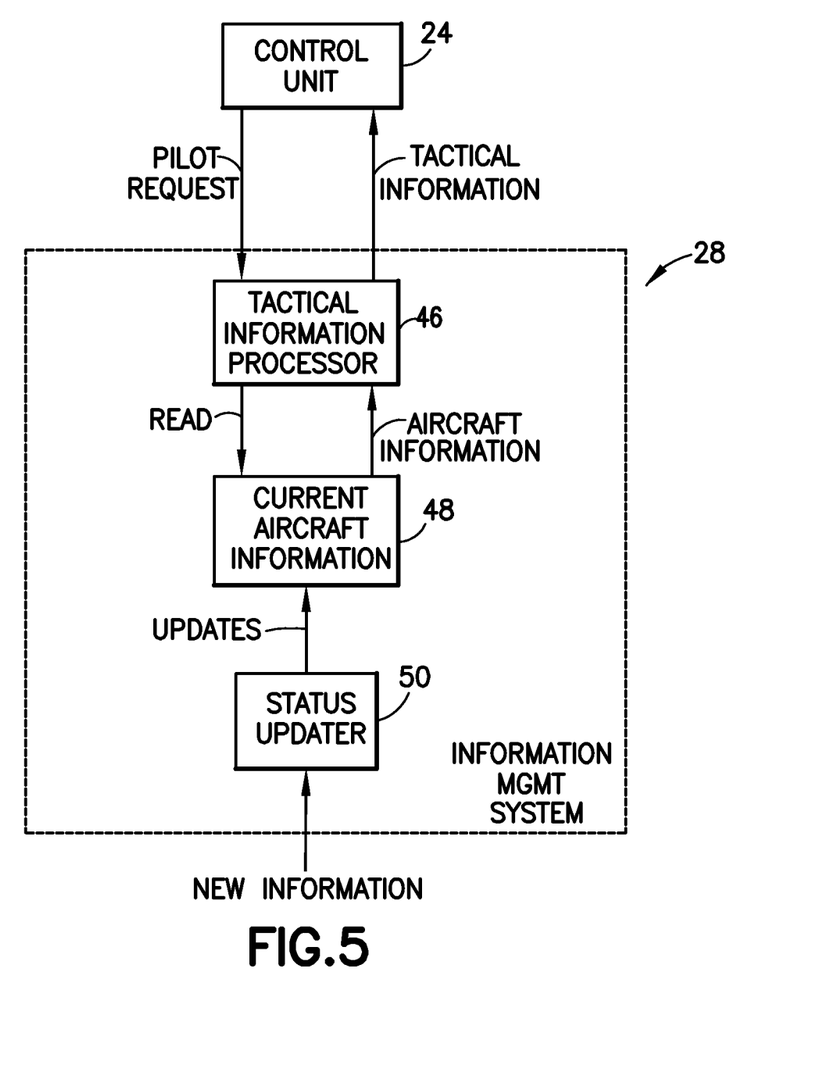
FIG. 5 is a block diagram representing components of an information management system in accordance with another embodiment.

In accordance with an alternative embodiment shown in FIG. 5, an information management system 28 may comprise a tactical information processor 46 dedicated to providing tactical information for display, current aircraft flight information 48 stored in local memory (e.g., random access memory), and a status updater 50 (also a computer or processor) which receives new information from the various airplane systems and continually updates the parameter values included in the stored current aircraft flight information 48. The tactical information processor 46 is programmed to process pilot requests for tactical information from the control unit 24 and then read the current values of requested tactical parameters and/or the current values of other aircraft parameters for use by the tactical information processor 46 in calculating the requested tactical parameters. In accordance with one implementation, the tactical information processor 46 sends the tactical information to the control unit 24 for display by the display unit. In an alternative implementation, the tactical information processor can send the tactical information directly to the display unit. The tactical information processor 46 can be programmed to periodically read the current values of the requested tactical parameters and/or the current values of other aircraft parameters for use in calculating the requested tactical parameters.

Figure 6:
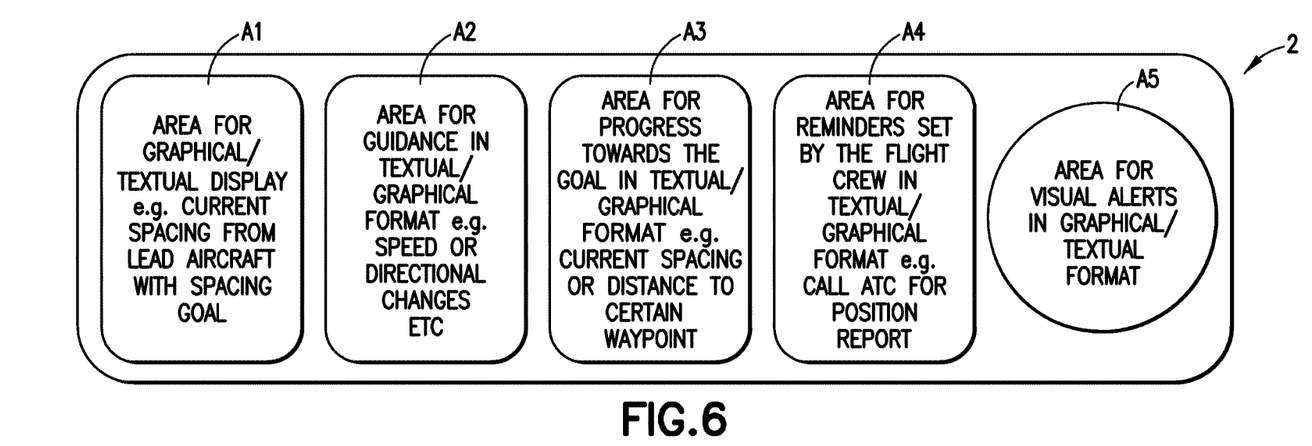
FIG. 6 is a diagram showing one possible arrangement of display areas on a display unit of a type depicted in any one of FIGS. 1 through 3.

FIG. 6 shows one example of a format for displaying information on the viewing surface of a display unit of a type depicted in any one of FIGS. 1 through 3. The display area 2 may be divided into a plurality of sections (five sections A1 through A5 shown in the example) depending upon the need for information. Section A1 can be used for graphical/textual display of information, such as the current spacing between ownship and a leading aircraft with a spacing goal. Section A2 can be used to display guidance in graphical/textual format, such as changes in aircraft speed or heading. Section A3 can be used to display indicators showing the progress towards the goal in graphical/textual format, such as current spacing between ownship and a leading aircraft or distance to a certain waypoint. Section A4 can be used to display reminders set by the flight crew in graphical/textual format, such as when to call air traffic control (ATC) to provide a position report. Section A5 may be reserved for display of visual alerts to inform the flight crew when something is wrong or should be attended to by the pilot.

Section A5 can be used to display visual alerts in graphical/textual format, such as an alert that the spacing between ownship and a leading aircraft is too great.

Figure 7:
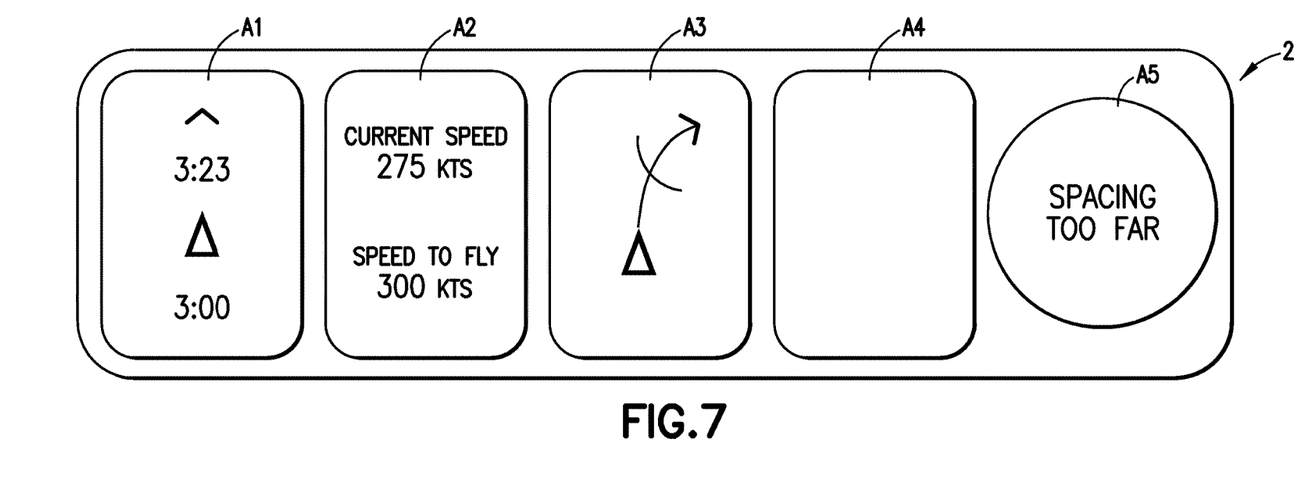
FIG. 7 is a diagram showing a screenshot in accordance with one embodiment of a display unit displaying one configuration of tactical information.

FIG. 7 shows one example of the types of information which can be displayed in accordance with the format depicted in FIG. 6. In this example, the flight crew is instructed to stay behind the lead aircraft (indicated by the chevron in Sections A1 and A3 of display area 2) at a certain interval (distance or time interval). (Ownship is indicated by the triangle in Sections A1 and A3.) In this example, an airplane system(s) provides information that is displayed in the display area 2. Section A1 in FIG. 7 shows the current time interval (3:23) separating ownship from the lead aircraft. Section A2 is used to provide speed guidance from the airplane system for the flight crew to achieve for the task at hand (i.e., the current speed is 275 knots and the target speed is 300 knots). Section A3 is used to provide overall situational awareness in graphical format, showing where the lead aircraft (indicated by a chevron) is in relation to ownship (indicated by a triangle) and where ownship needs to be (indicated by the arc which intersects the intended track of ownship). The symbology in Sections A2 and A3 indicates that ownship is too far behind the lead aircraft and needs to speed up to 300 knots. The correct interval would be achieved when ownship is at a location behind the leading aircraft corresponding to the arc displayed in Section A3. Section A4 in this example is blank because the flight crew does not need anything else for the task at hand, i.e., achieving a target separation interval. Section A5 displays a visual alert to inform the flight crew that ownship is currently too far behind the leading aircraft.

While the invention has been described with reference to various embodiments, it will be understood by those skilled in the art that various changes may be made and equivalents may be substituted for elements thereof without departing from the scope of the invention. In addition, many modifications may be made to adapt the teachings herein to a particular situation without departing from the scope thereof. Therefore it is intended that the claims not be limited to the particular embodiments disclosed.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A flight deck display comprising:
a control panel of a flight deck;
first and second larger display units installed in said control panel with a space therebetween; and
a thin display unit installed in said space between said first and second larger display units, said thin display unit comprising:
a housing in the shape of a cuboid having external faces;
a non-transitory tangible computer readable medium for storing data,
an image processor housed in said housing, said image processor being programmed to generate image data which is a function of said stored data;
a liquid crystal display screen affixed to one external face of said housing and operatively coupled to said image processor for displaying an image that is a function of electronic image data generated by said image processor; and
a light-reflecting viewing surface disposed external to and pivotably coupled to said housing,
wherein said viewing surface is arranged at an angular position such that an image projected by said liquid crystal display screen is reflected from said viewing surface toward a vantage point of a pilot on the flight deck.

2. The flight deck display as recited in claim 1, wherein said image processor is programmed to generate image data representing reversed alphanumeric characters.

3. The flight deck display as recited in claim 1, wherein said liquid crystal display screen is fixed relative to said housing and the angular position of said viewing surface relative to said liquid crystal display screen is adjustable.

4. The flight deck display as recited in claim 1, wherein said viewing surface comprises a mirror or glass.

5. The flight deck display as recited in claim 1, wherein said housing is mounted on said control panel with said one external face projecting generally perpendicular to said control panel.

6. The flight deck display as recited in claim 1, wherein said housing has a height in a range of one to two inches and a width in a range of four to ten inches.

7. The flight deck display as recited in claim 1, wherein said housing of said thin display unit is configured such that said housing does not block any information being displayed on said first and second larger display units.

8. A flight deck display comprising:
a control panel of a flight deck;
a large display unit installed in said control panel; and
a thin display unit installed in a space adjacent to said large display unit, said thin display unit comprising:
a housing in the shape of a cuboid having external faces;
a non-transitory tangible computer readable medium for storing data,
an image processor housed in said housing, said image processor being programmed to generate image data which is a function of said stored data;
a liquid crystal display screen affixed to one external face of said housing and operatively coupled to said image processor for displaying an image that is a function of electronic image data generated by said image processor; and
a light-reflecting viewing surface disposed external to and pivotably coupled to said housing,
wherein said viewing surface is arranged at an angular position such that an image projected by said liquid crystal display screen is reflected from said viewing surface toward a vantage point of a pilot on the flight deck.

9. The flight deck display as recited in claim 8, wherein said image processor is programmed to generate image data representing reversed alphanumeric characters.

10. The flight deck display as recited in claim 8, wherein said liquid crystal display screen is fixed relative to said housing and the angular position of said viewing surface relative to said liquid crystal display screen is adjustable.

11. The flight deck display as recited in claim 8, wherein said viewing surface comprises a mirror or glass.

12. The flight deck display as recited in claim 8, wherein said housing is mounted on said control panel with said one external face projecting generally perpendicular to said control panel.

13. The flight deck display as recited in claim 8, wherein said housing has a height in a range of one to two inches and a width in a range of four to ten inches.

14. The flight deck display as recited in claim 8, wherein said housing of said thin display unit is configured such that said housing does not block any information being displayed on said large display unit.

15. A flight deck display comprising:
a control panel of a flight deck;
first and second display units installed in said control panel with a space therebetween; and
a third display unit installed in said space between said first and second display units, said third display unit comprising:
a housing in the shape of a cuboid having external faces;
a non-transitory tangible computer readable medium for storing data,
an image processor housed in said housing, said image processor being programmed to generate image data which is a function of said stored data;
a liquid crystal display screen affixed to one external face of said housing and operatively coupled to said image processor for displaying an image that is a function of electronic image data generated by said image processor; and
a light-reflecting viewing surface disposed external to and pivotably coupled to said housing,
wherein said housing of said third display unit is configured such that said housing does not block any information being displayed on said first and second display units, and said viewing surface is arranged at an angular position such that an image projected by said liquid crystal display screen is reflected from said viewing surface toward a vantage point of a pilot on the flight deck.

16. The flight deck display as recited in claim 15, wherein said image processor is programmed to generate image data representing reversed alphanumeric characters.

17. The flight deck display as recited in claim 15, wherein said liquid crystal display screen is fixed relative to said housing and the angular position of said viewing surface relative to said liquid crystal display screen is adjustable.

18. The flight deck display as recited in claim 15, wherein said viewing surface comprises a mirror or glass.

19. The flight deck display as recited in claim 15, wherein said housing is mounted on said control panel with said one external face projecting generally perpendicular to said control panel.

20. The flight deck display as recited in claim 15, wherein said housing has a height in a range of one to two inches and a width in a range of four to ten inches.

\* \* \* \* \*